United States Patent [19]

Piepenbreier et al.

[11] Patent Number: 4,790,248
[45] Date of Patent: Dec. 13, 1988

[54] DUAL GIMBAL COUPLING

[75] Inventors: Ernst Piepenbreier; Josef Trost, both of Essen, Fed. Rep. of Germany

[73] Assignee: Thyssen Industrie AG, Fed. Rep. of Germany

[21] Appl. No.: 775,490

[22] Filed: Sep. 12, 1985

[30] Foreign Application Priority Data

Sep. 14, 1984 [DE] Fed. Rep. of Germany ....... 3433801
Apr. 19, 1985 [DE] Fed. Rep. of Germany ....... 3514124

[51] Int. Cl.$^4$ ..................... B61B 12/00; F16D 3/04; F16D 3/62
[52] U.S. Cl. ..................... 105/131; 105/132.1; 464/69
[58] Field of Search ..................... 105/131, 132, 132.1; 267/152, 141.4, 141.5, 273, 279–281, 285; 464/69, 85

[56] References Cited

U.S. PATENT DOCUMENTS

| | | | |
|---|---|---|---|
| 527,126 | 10/1894 | Raffard | 105/132 X |
| 1,780,105 | 10/1930 | Anderson | 105/132 |
| 2,073,852 | 3/1937 | Radford | 464/69 |
| 3,602,153 | 8/1971 | Korn | 105/131 |
| 4,051,784 | 10/1977 | Ries | 105/131 |
| 4,118,952 | 10/1978 | Kobayashi | 464/69 |
| 4,135,453 | 1/1979 | Koch et al. | 105/131 |
| 4,278,726 | 7/1981 | Wieme et al. | 267/152 |

FOREIGN PATENT DOCUMENTS

| | | | |
|---|---|---|---|
| 0167654 | 1/1986 | European Pat. Off. | 464/69 |
| 2705598 | 8/1978 | Fed. Rep. of Germany | 464/69 |
| 1180374 | 2/1970 | United Kingdom | 105/132 |

Primary Examiner—Robert B. Reeves
Assistant Examiner—Scott H. Werny
Attorney, Agent, or Firm—McGlew and Tuttle

[57] ABSTRACT

A dual coupling (1) comprises two elastic and articulated couplings (2 and 2a) interconnected by a hollow, intermediate shaft (3). Each one of the couplings (2,2a) contain an outer half (4,4a) with a hub (5,5a) from which extend several arms (6). Between them sit more arms (6a) of the intermediate shaft (3). With its arms (6a), the intermediate shaft represents the inner halves of the couplings (2,2a). The ends of the interacting arms (6 and 6a) are interconnected by rubber-elastic connecting rods (7) so that two rows (8) of arms are provided on bolts (10) to the left and right of the arms (6 and 6a) forming a joint plane. Therefore, two joint planes are present. While the connecting rods are connected to the bolts (10) in form closing fashion, the bolts are fixed or articulated in the arms (6 and 6a). One hub (5) is connected to a solid axle (15) and the other hub (5a) to a hollow shaft (18). The other hubs, and the axle (15) going through then can deflect angularly relative to each other and can be offset axially relative to each other with gimbal motion without noteworthy return forces originating. The dual coupling (1) is intended in particular for use in rail vehicle axle drives.

17 Claims, 4 Drawing Sheets

DUAL GIMBAL COUPLING

FIELD AND BACKGROUND OF THE INVENTION

The present invention relates in general to rail vehicle drives and in particular to a new and useful dual gimbal coupling provided between a hollow shaft and a rail vehicle axis going through it and consisting of a hollow, stub-shaped, intermediate shaft enclosing the axle with clearance. The invention includes elastic and articulated couplings disposed at the ends of the intermediate shaft, the mutually facing coupling halves containing a common hub in the form of the intermediate shaft and the outer coupling halves having hubs suited to the hollow shaft or the axle. Each of the couplings has arms which emanate from their hubs and lie, alternating one behind the other, in a common plane perpendicular to the shafts, there being disposed at the end of each arm, two shaft-parallel bolts juxtaposed in the direction of rotation, from which bolts emanates a spherically movable connecting rod to the adjacent arms, at least at one of the coupling sides.

A coupling of similar type is known from German OS No. 27 16 115. However, it is a characteristic there that the connecting rods, which are fishplate-like and interconnect two neighboring bolts of the interacting coupling halves, are rigid in themselves. The power is transmitted between the connecting rods and the bolts through spherically designed rubber bearings permitting a spherical deflection of the connecting rods. The limits of the deflectability are determined by the rubber layer of these spherical bearings. Since the rubber layer is relatively thin and the drive moment must be transmitted as circumferential force, the possible angular deflection is limited. Added to this is the fact that, due to the small rubber mass, the return forces increase out of proportion to the angular deflection.

SUMMARY OF THE INVENTION

It is an object of the present invention to increase the elastic, angular deflection of a dual coupling of the kind described at the outset and at the same time decrease the return forces. The coupling, and in particular the individual connecting rods are to be suited to have their twist stiffness influenced by simple means. Also, the preloading of the connecting rods is to be made manageable simply and at no great cost.

The invention consists in that the connecting rods enclose the arms in two juxtaposed rows and that, except for their mobility perpendicular to the shafts, they are firmly gripped at the bolts and consist of rubber-like material.

Fishplate-like, elastic connecting rods are known from the "Kupplung-Atlas", 1975, by A. Schalitz, page 71, picture 3.2.6-23. However they are not suited for rail vehicle couplings.

The advantages derivable from the inventive features of the dual coupling are based on the rubber-like material of the connecting rods. Their division into two rows assures the greatest possible power transmission versus an imaginable single row design, but reduces the twisting resistance so that the gimbal motion of the coupling, i.e. its angular deflection, is furthered while at the same time reducing the return forces. This is further favored by the fact that the connecting rod arrangement in two rows permits stressing the coupling uniformly and does not permit swelling forces or rotation to originate. Therefore, its application to high speed ranges presents no problems. On account of their mobility perpendicular to the shafts, the connecting rods are primarily stressed in tension in all operating situations. In addition, the rubber-like material opens the possibility modifying the elasticity of the coupling, i.e. the connecting rods, e.g. by using additives, or to bring about their preloadability by simple means.

For instance, fiberglass reinforced or carbon fiber reinforced filaments may be embedded in the connecting rod material.

To be able to achieve a preload, the distance between the bolt seats of the connecting rods is expediently smaller in their unassembled state than the distance between the bolts.

The ends of each connecting rod have advantageously a bushing each enclosing the bolt, and the contacting surfaces between the bushing and the bolt are tapered on the one hand while being cylindrical between the bushing and the connecting rod on the other. With these features, the desired preload is achieved without other fixtures, because when the tapered bushing slides axially onto the tapered bolts, they pull the shorter connecting rod radially to the dimension of the bolt spacing.

It has proven to be particularly expedient to use the dual coupling to connect an axle of a rail vehicle axle drive mounted in a truck or frame to a hollow transmission output shaft enclosing the axle with clearance, said transmission being connected to the face of an electric motor lying in the travel direction and mounted in the truck or frame together with the electric motor.

Accordingly, an object of the invention is to provide a dual gimbal coupling for connecting a hollow rail vehicle shaft to a rail vehicle axle extending through the rail vehicle shaft, comprising a hollow intermediate shaft extending around the rail vehicle axle with radial clearance and including opposite ends, a first hub adapted for connection to the axle adjacent one end of the intermediate shaft, a second hub adapted for connection to the rail vehicle shaft adjacent an opposite end of the intermediate shaft, and a plurality of alternating arms extending from the opposite ends of the intermediate shaft and from the first and second hubs which, for each end of the intermediate shaft, lie in a common plane which is perpendicular to the rail vehicle axle and shaft. Two parallel bolts are connected to each arm and elastic rods or plates are connected between bolts of alternating arms with the rods being provided in pairs and in parallel planes on opposite sides of the arms.

A further object of the invention is to provide a dual gimbal coupling which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
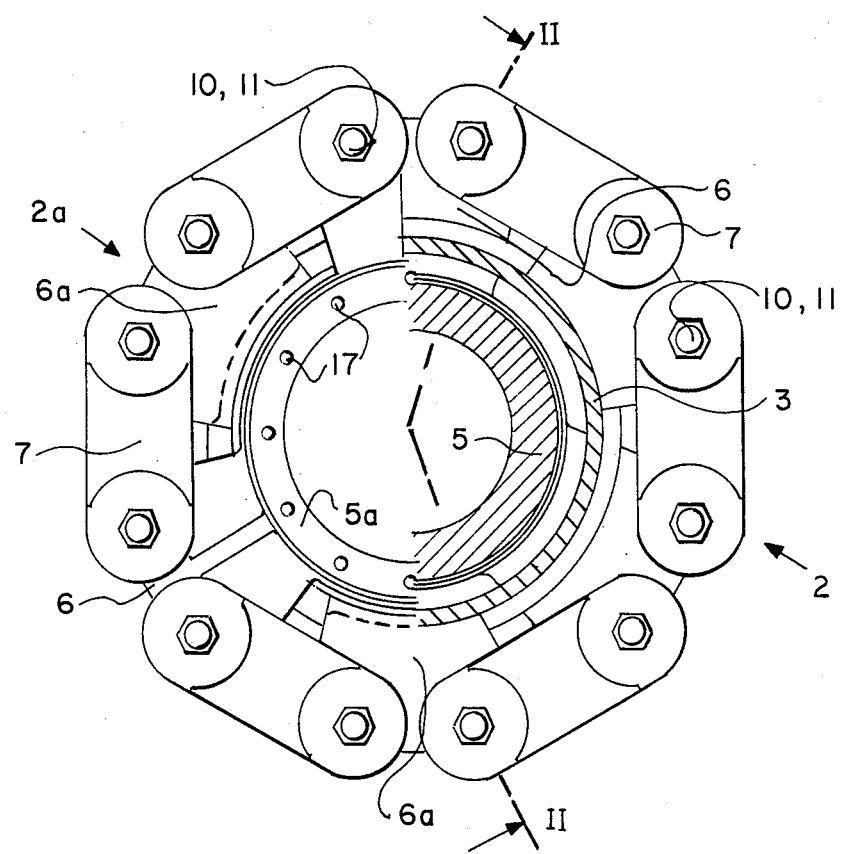
FIG. 1 is a transverse sectional view, partly in elevation, of a dual coupling taken along the line I—I of FIG. 2.

Referring to the drawings in particular, the invention embodied therein comprises a dual gimbal coupling generally designated 1 which connects a hollow rail vehicle shaft to a rail vehicle axle extending through the shaft and which permits angular deflection between the shaft and the axle and also permits an off center movement between the parallel axle and shaft.

Figure 2:
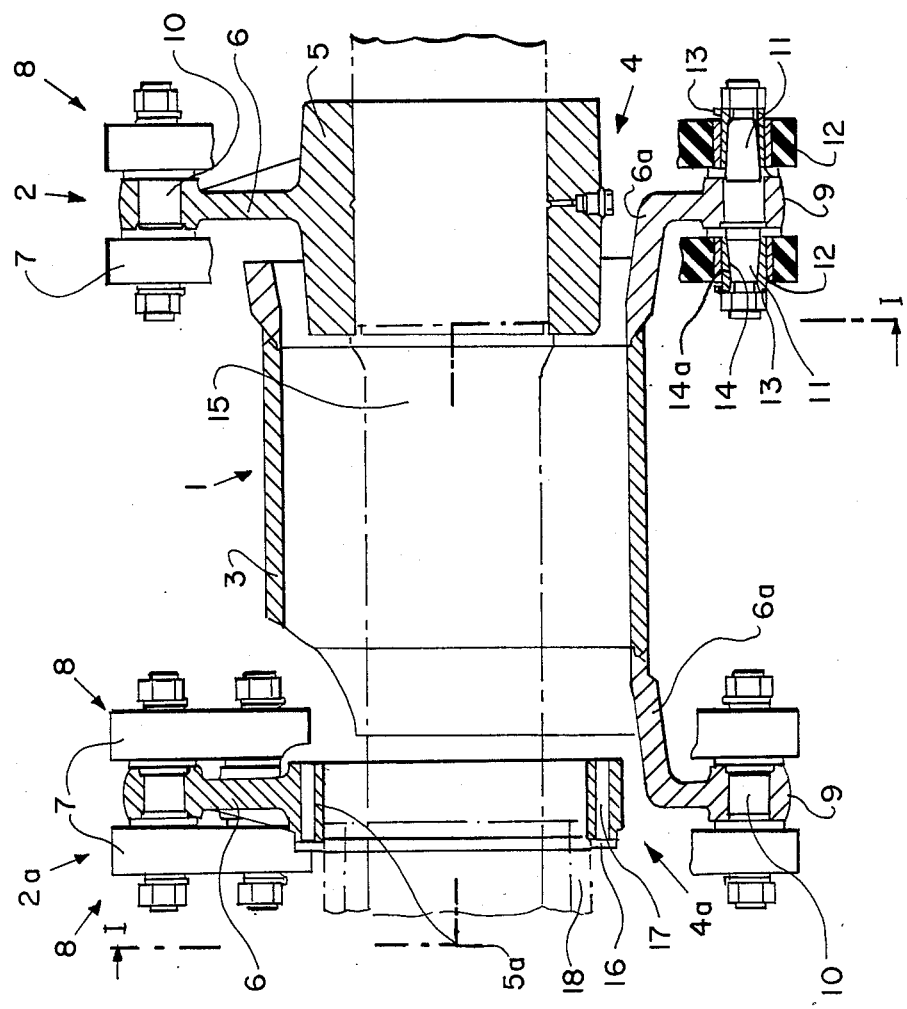
FIG. 2 is a longitudinal sectional view taken along the line II—II of FIG. 1.

According to FIGS. 1 and 2, the dual coupling 1 consists of two elastic and articulated couplings 2 and 2a, interconnected by a hollow, stub-shaped, intermediate shaft 3. Each one of the couplings 2 and 2a contain an outer half 4 and 4a, respectively, with a hub 5 and 5a, respectively, from which several arms extend radially (three are shown). The inner halves are formed by the intermediate shaft 3 and thus transition into each other. The intermediate shaft 3 also contains arms 6a which are provided at the shaft ends, engaging between the arms 6 of the hubs 5 and 5a in such a manner that, together with the hubs 5 and 5a, they lie each in a plane perpendicular to the hubs. The arms 6 and 6a of the same plane are interconnected at their ends by elastic connecting rods or fishplates 7 so that, in the area of the hubs 5 and 5a, the dual coupling 1 has a total of two joint planes, around which gimbal motions of considerable size can take place.

In each joint plane, the connecting rods or plates 7 are arranged on both sides of the arms 6 and 6a, i.e. each in two rows 8. This purpose is served by fixed bolts 10 which are inserted into holes 9 and are juxtaposed in pairs on one common circle. Bolts 10 are jointed to the arms 6 and 6a and have tapered pins 11 projecting on both sides and retaining the elastic connecting rods 7 in formclosing fashion while maintaining mobility in the plane perpendicular to the bolts 10. The connecting rods 7 always connect two adjacent bolts 10, one of which sits in an arm 6 and the other in an arm 6a.

The connecting rods 7 are of rubber with fiberglass reinforced, looped, synthetic filaments vulcanized in. The rotary elasticity of the coupling connection and the twist elasticity of the connecting rods and, hence, the degree of angular deflection of the dual coupling are matched to the requirements by the number and shape of the loops.

For the accommodation of the pins 11, the connecting rod ends, or metallic inserts 12 in them, have holes in which a bushing 13 fits tightly. Bushings 13 have an inner, tapered contact surface 14 mating with the pins 11. The contact surface 14a between the bushing 13 and the insert 12 is cylindrical. Now, if according to FIG. 3, a connecting rod 7 is inserted whose center distance a between the inserts 12 is smaller than the distance A between the adjacent pins 11, the connecting rod is stretched to the distance A when pressing the bushings 13 in (not shown), thereby prestressing it advantageously.

While the hub 5 sits on a solid axle 15, the hub 5a is connected to a hollow shaft 18 by means of a face gear 16 and screws extending through holes 17.

Figures 3, 4:
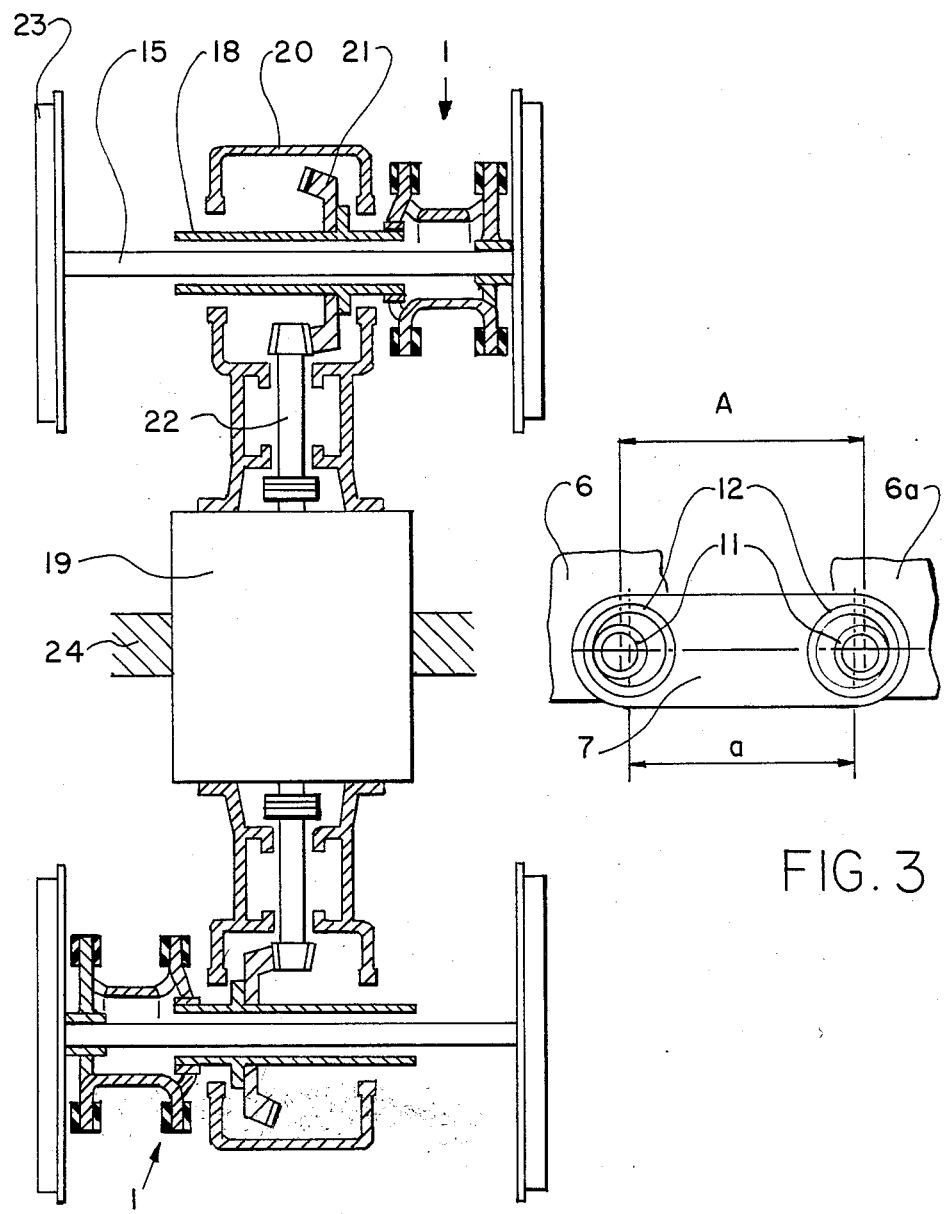
FIG. 3 is a side view taken during assembly of a connecting rod of the dual coupling, and on a larger scale.
FIG. 4 is a partial sectional view from above of a dual axle drive.

FIG. 4 shows the application of the dual coupling 1 to a dual axle drive for rail vehicles. An electric motor lying in the travel direction is designated 19, to whose faces are flanged or connected two angle transmissions 20, each of which drives the hollow shafts 18 by means of bevel gears 21 and 22, the hollow shafts 18 enclosing the shaft, or also the axle, 15 of the track wheels 23 with clearance. Motor 19' is connected to the frame 24 of the vehicle. It is in such a drive that the dual coupling is preferably used.

Figure 5:
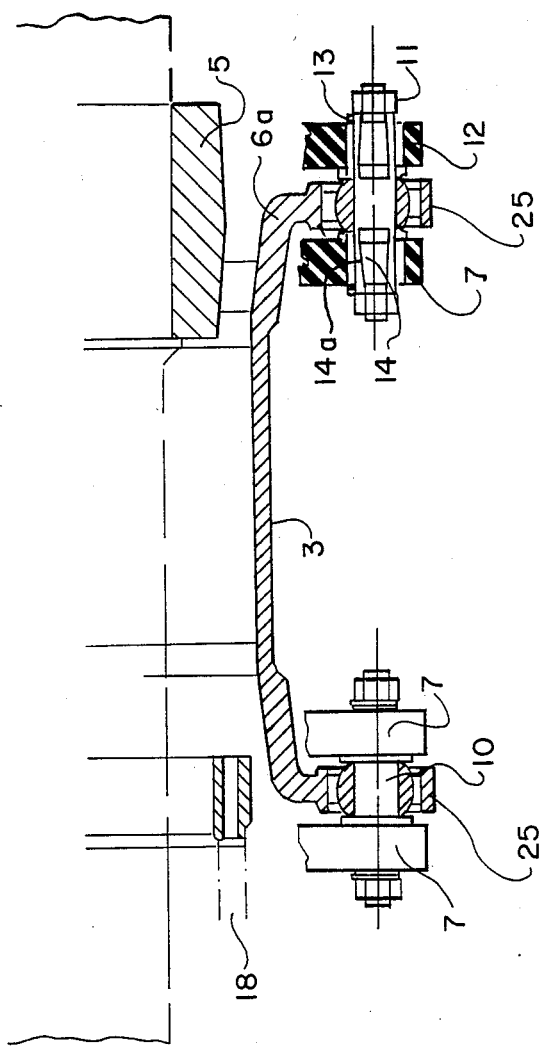
FIG. 5 is a partial view similar to FIG. 2, but showing another embodiment of the invention.

In the embodiment shown in FIG. 5, where the same numbers are used to designate similar parts, the bolts 10 are mounted in universal joint bearings 25 on the arms 6,6a. Since the joint center remains unchanged relative to the arms, these bolts 10 must also be considered stationary. As in the other embodiments too, the connecting rods or plates 7 are distributed symmetrically and in pairs over the circumference of the arms 6,6a, a total of six connecting rod pairs being provided.

The arrangement of the connecting rods 7 in pairs is such that always three pairs of the connecting rods 7 are stressed in tension, depending on the direction of the forces. This results in a triangular arrangement of the connecting rods 7 which assures a statically and dynamically defined fixation of the hollow gimbal shaft 3. In case of a displacement of the connecting rods 7, whether parallel or angular, the bolts 10 adjust in their joint bearings 25 so that the two connecting rods to the left and right of the joint bearing always are under the same tensional stress. This makes the return forces of this coupling disappear, if the friction in the joint bearings 25 is neglected. The required rotary elasticity of the entire coupling is determined by the elastic connecting rods 7.

Due to the preferably maintenance free joint bearings 25, a return force free displacement possibility of the connecting rods 7 at very large deflection angles theoretically results. This deflection angle is always such that an equalization of forces between the two connecting rods 7 of a connecting rod pair is assured. Depending on the load direction, only three connecting rod pairs are stressed at any one time because the connecting rods 7 are stressed in tension only. The rotary elasticity of the entire coupling can be suited to the respective requirements without having to affect return forces and absolute offset. Due to the arrangement of three active connecting rod pairs in each plane, depending on the load direction, the hollow gimbal shaft 18 is centered statically and dynamically.

Accordingly the invention is a dual gimbal coupling for connecting a hollow rail vehicle shaft to a rail vehicle axle extending through the shaft, comprising:

a hollow intermediate shaft (3) extending around the rail vehicle axle (15) with radial clearance, the intermediate shaft having opposite ends each with a plurality of outwardly extending arms (6a) said arms at each opposite end lying in a common plane at each opposite end of said hollow intermediate shaft;

a first hub (5) adapted for connection to the axle (15) and disposed adjacent one end of said intermediate shaft, said first hub having a plurality of outwardly extending arms (6) alternating with said plurality of arms at one end of said intermediate shaft and lying in the common plane at said one end of the intermediate shaft;

a second hub (5a) adapted for connection to the hollow rail vehicle shaft (18) and disposed adjacent the opposite end of said intermediate shaft, said second hub having a plurality of outwardly extending arms (6) alternating with said arms at the opposite end of said intermediate shaft and lying in the common plane at said opposite end of said intermediate shaft; and a pair of elastic rod members (7,7) connected between each arm of said intermediate shaft and an adjacent arm of said first and second hubs, said rod members in each pair of rod members lying in parallel planes on opposite sides of each common plane.

While specific embodiments of the invention have been shown and described in detail to illustrate the application of the principles of the invention, it will be understood that the invention may be embodied otherwise without departing from such principles.

What is claimed is:

1. A dual gimbal coupling for connecting a hollow rail vehicle shaft to a rail vehicle axle extending through the shaft, comprising
    a hollow intermediate shaft extending around the rail vehicle axle with radial clearance, the intermediate shaft having opposite ends each with a plurality of outwardly extending arms, said arms at each opposite end lying in a common plane at each opposite end of said hollow intermediate shaft;
    a first hub adapted for connection to the axle and disposed adjacent one end of said intermediate shaft, said first hub having a plurality of outwardly extending arms alternating with said plurality of arms at one end of said intermediate shaft and lying in the common plane at said one end of the intermediate shaft;
    a second hub adapted for connection to the hollow rail vehicle shaft and disposed adjacent the opposite end of said intermediate shaft, said second hub having a plurality of outwardly extending arms alternating with said arms at the opposite end of said intermediate shaft and lying in the common plane at said opposite end of said intermediate shaft; and
    a pair of elastic rod members connected between each arm of said intermediate shaft and an adjacent arm of said first and second hubs, said rod members in each pair of rod members lying in parallel planes on opposite sides of each common plane, each elastic rod member including first and second metallic inserts;
    a pair of parallel bolts connected to each arm of said intermediate shaft, said first hub and said second hub, said parallel bolts each extending perpendicularly to the common planes, each bolt extending on opposite sides of each arm, said pairs of rod members being connected through the associated metallic insert between bolts of adjacent arms of said intermediate shafts of said first hub and said second hub;
    a bushing connected between each bolt and a metallic insert of said rod member, said bushing having an inner tapering surface engaged with a tapering surface of said bolt and an outer cylindrical surface engaging said rod member.

2. A coupling according to claim 1, wherein each elastic rod member includes fiber reinforcement filaments embedded therein.

3. A coupling according to claim 1, wherein each elastic rod member of each pair of elastic rod members is connected to said bolts in a prestretched condition.

4. A coupling according to claim 1, including a rail vehicle transmission rotatably carrying said hollow rail vehicle shaft, an electric motor connected to said transmission for turning said hollow rail vehicle shaft, and a truck frame connected to said electric motor for supporting said electric motor in a direction parallel to a travel direction of said frame which is transverse to said hollow rail vehicle shaft and rail vehicle axle.

5. A coupling according to claim 1, including articulating means connected between each bolt and its respective arm for permitting articulation of each bolt.

6. A coupling according to claim 5, wherein said articulating means comprises a universal joint bearing.

7. A coupling according to claim 1, wherein each bolt is rigidly fixed to its respective arm.

8. A coupling according to claim 7, wherein said pairs of rod members are distributed symmetrically and circumferentially around said hubs and said intermediate shaft.

9. A coupling according to claim 8, including six pairs of rod members, there being three arms extending from said hollow intermediate shaft from each end thereof and three arms extending from each of said first and second hubs.

10. A dual coupling according to claim 1, wherein fiberglass reinforced or carbon fiber reinforced filaments are embedded in the material of the rod members.

11. A dual coupling according to claim 1, wherein a distance (a) between the points of the rod members accommodating the bolts is smaller in an unconnected state than a distance (A) between the bolts.

12. A dual coupling according to claim 1, wherein said hollow output shaft is connected with a transmission, and encloses the axle with clearance, said transmission being connected to a face of an electric motor lying in a travel direction and mounted together with the transmission in the truck.

13. A dual coupling according to claim 1 wherein the bolts are mounted in the arms so as to be articulated.

14. A dual coupling according to claim 1, wherein the bolts are mounted in universal joint bearings.

15. A dual coupling according to claim 1, wherein the bolts are permanently joined to the arms.

16. A dual coupling according to claim 1, wherein the rod members are distributed over the circumference of the arms symmetrically and in pairs.

17. A dual coupling according to claim 6, wherein six pairs of rod members are provided.

* * * * *